Nov. 22, 1966  B. L. GUY  3,286,726
GAS REGULATOR
Filed April 20, 1964  4 Sheets-Sheet 1
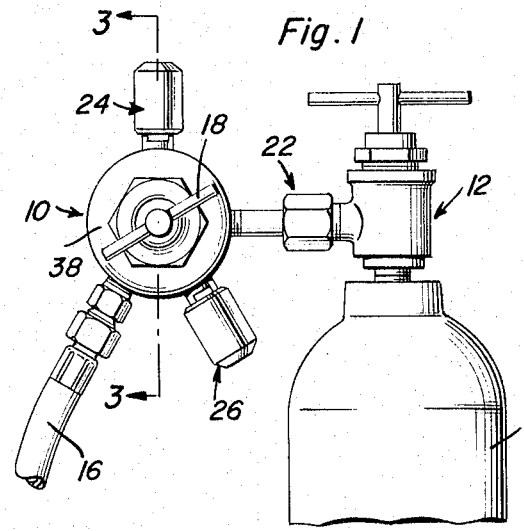
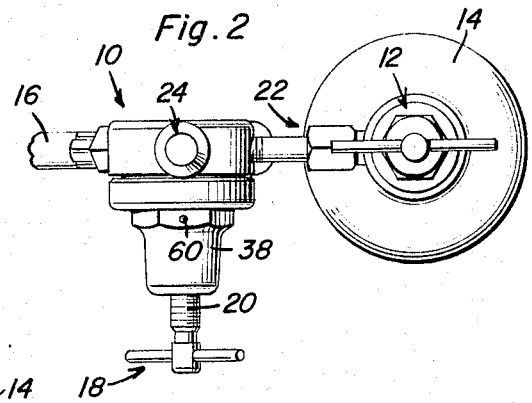
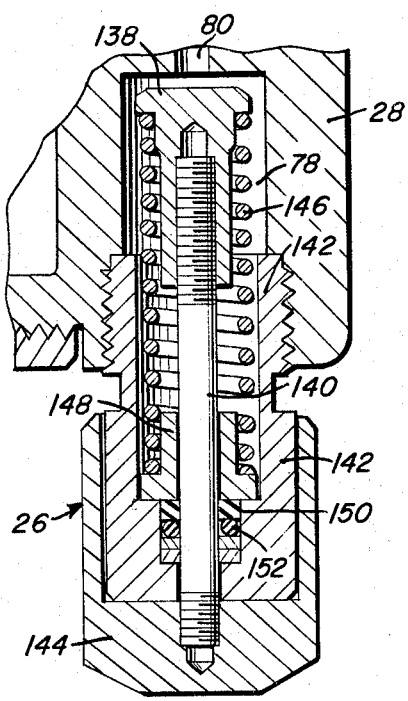
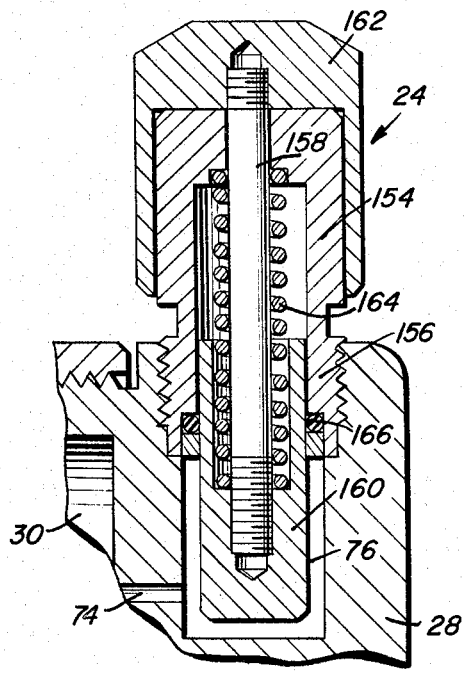
Billy Lynn Guy
INVENTOR.

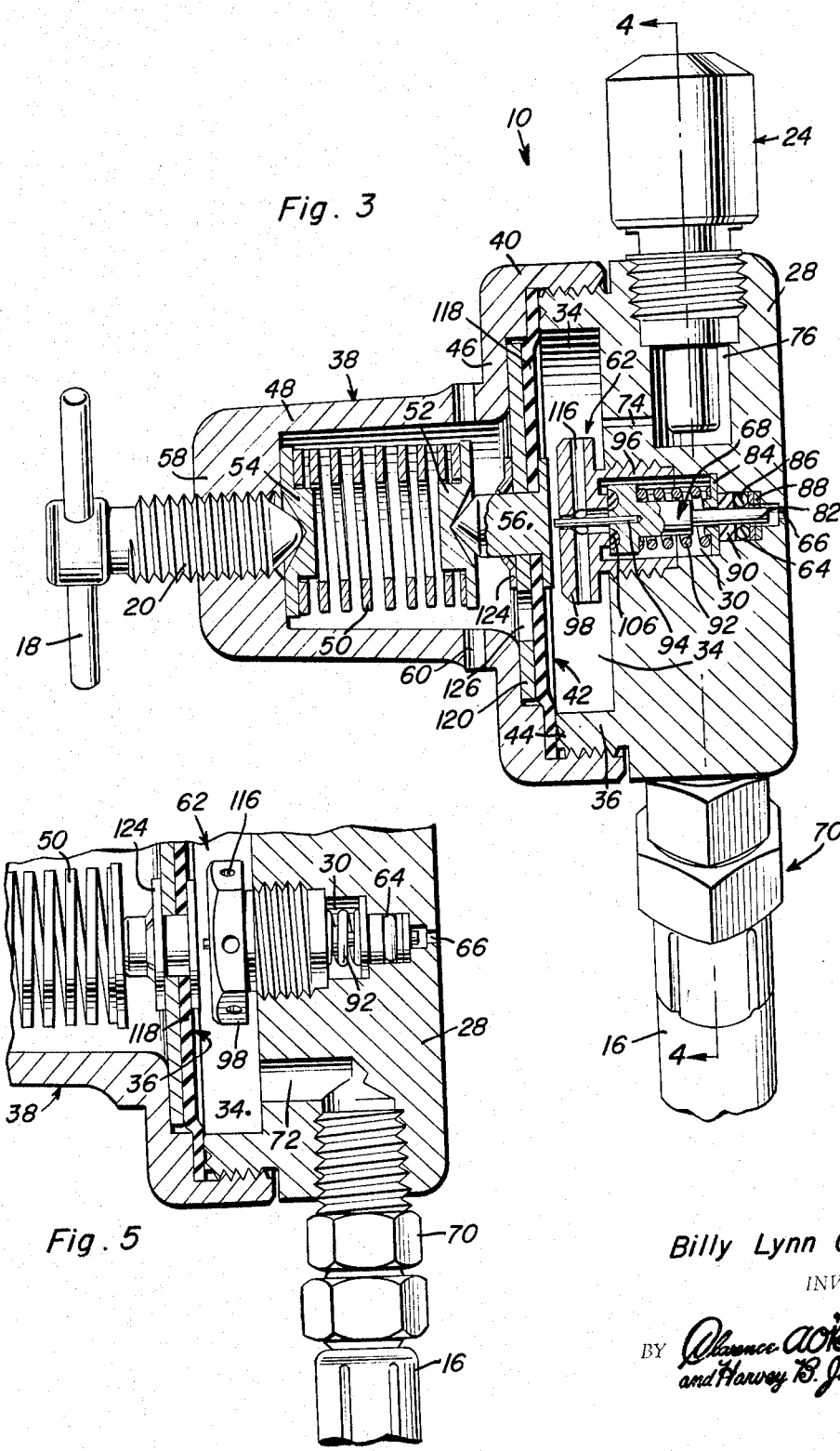

Nov. 22, 1966  B. L. GUY  3,286,726
GAS REGULATOR
Filed April 20, 1964  4 Sheets-Sheet 3

Billy Lynn Guy
INVENTOR.

BY *Clarence A. O'Brien*
*and Harvey B. Jackson*
Attorneys

Nov. 22, 1966  B. L. GUY  3,286,726
GAS REGULATOR
Filed April 20, 1964  4 Sheets-Sheet 4
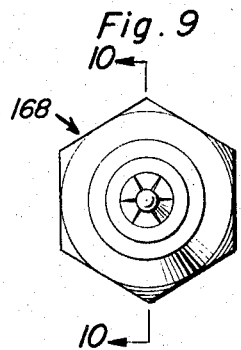
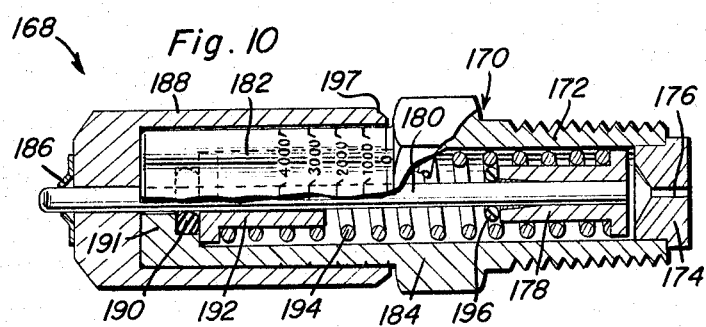
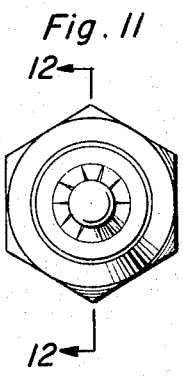
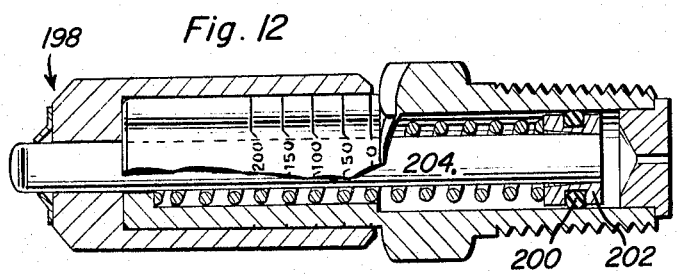
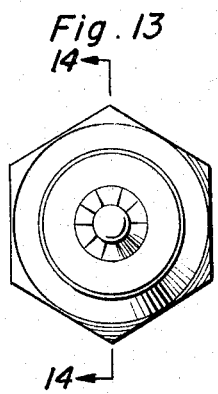
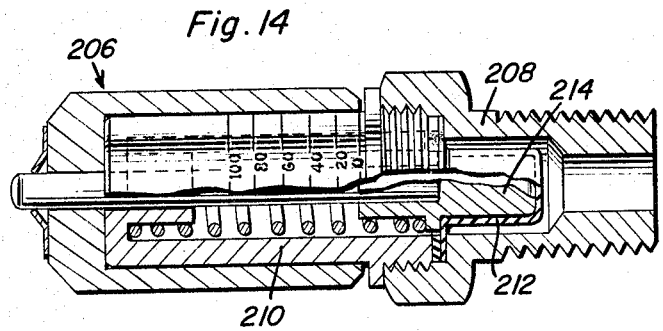
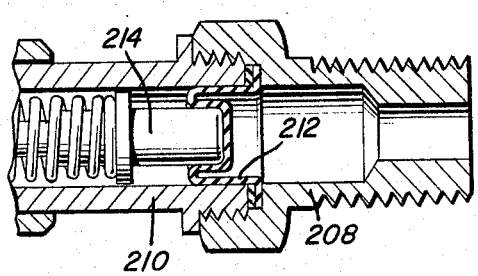
Billy Lynn Guy
INVENTOR.
BY *Clarence A. O'Brien*
and *Harvey B. Jacobson*
Attorneys

United States Patent Office 3,286,726
Patented Nov. 22, 1966

3,286,726
GAS REGULATOR
Billy Lynn Guy, Lexington, Ky., assignor to Kim Products, Inc., Burgin, Ky., a corporation of Kentucky
Filed Apr. 20, 1964, Ser. No. 361,025
7 Claims. (Cl. 137—505.18)

This invention relates to a pressure regulating and indicating assembly.

A primary object of the present invention is to provide a new and useful regulator assembly for fluid under pressure such as a source of oxygen under pressure in a supply tank. The assembly of the present invention in addition to various constructional and operational features also includes facilities for indicating both the pressure of the fluid at the source and the pressure in the outlet.

An additional object of the present invention is to provide a fluid pressure regulator of the diaphragm type having a safety backing feature limiting expansion of the diaphragm chamber and confining rupture of the diaphragm to a predetermined location when the outlet pressure becomes excessive so as to protectively vent such pressure.

A further object of the present invention is to provide a regulator valve assembly having a regulating valve member provided with an annular resilient valve seat insert arranged to be engaged with a relatively hard surface nozzle inlet for absorbing shock and to avoid extrusion of the seating insert by differential pressure applied thereto and by virtue of which leakage is prevented because of minute particles becoming lodged between the valve-engaging surfaces.

A still further object of the present invention is to provide a regulating valve assembly to which atmospheric referencing pressure is applied thereto in a valve closing direction opposing the regulated output pressure so as to reduce the effect of fluctuating inlet pressures.

Other objects of the present invention include the mounting of a pair of pressure indicators on a regulating valve assembly for measuring the inlet and outlet pressures respectively. Several replaceable types of pressure indicators may therefore be used in accordance with the range of working pressures and source supply pressures with which the regulating valve assembly is associated.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of the regulating valve assembly of the present invention in one typical installation.

FIGURE 2 is a top plan view of the installed regulating valve assembly illustrated in FIGURE 1.

FIGURE 3 is a sectional view taken substantially through a plan indicated by section line 3—3 in FIGURE 1.

FIGURE 5 is a partial sectional view taken substantially through a plane indicated by section line 5—5 in FIGURE 4.

FIGURE 6 is a partial sectional view taken substantially through a plane indicated by section line 6—6 in FIGURE 4.

FIGURE 7 is a partial sectional view taken substantially through a plane indicated by section line 7—7 in FIGURE 4.

FIGURE 9 is an end view of a modified form of pressure indicator capable of being used with the assembly of the present invention.

FIGURE 10 is a sectional view taken substantially through a plane indicated by section line 10—10 in FIGURE 9.

FIGURE 11 is an end view of a second modified form of pressure indicator.

FIGURE 12 is a sectional view taken substantially through a plane indicated by section line 12—12 in FIGURE 11.

FIGURE 13 is an end view of a third modified form of pressure indicator.

FIGURE 14 is a sectional view taken substantially through a plane indicated by section line 14—14 in FIGURE 13.

FIGURE 15 is a partial sectional view illustrating the pressure indicator of FIGURE 14 in another operative position.

Figure 4:
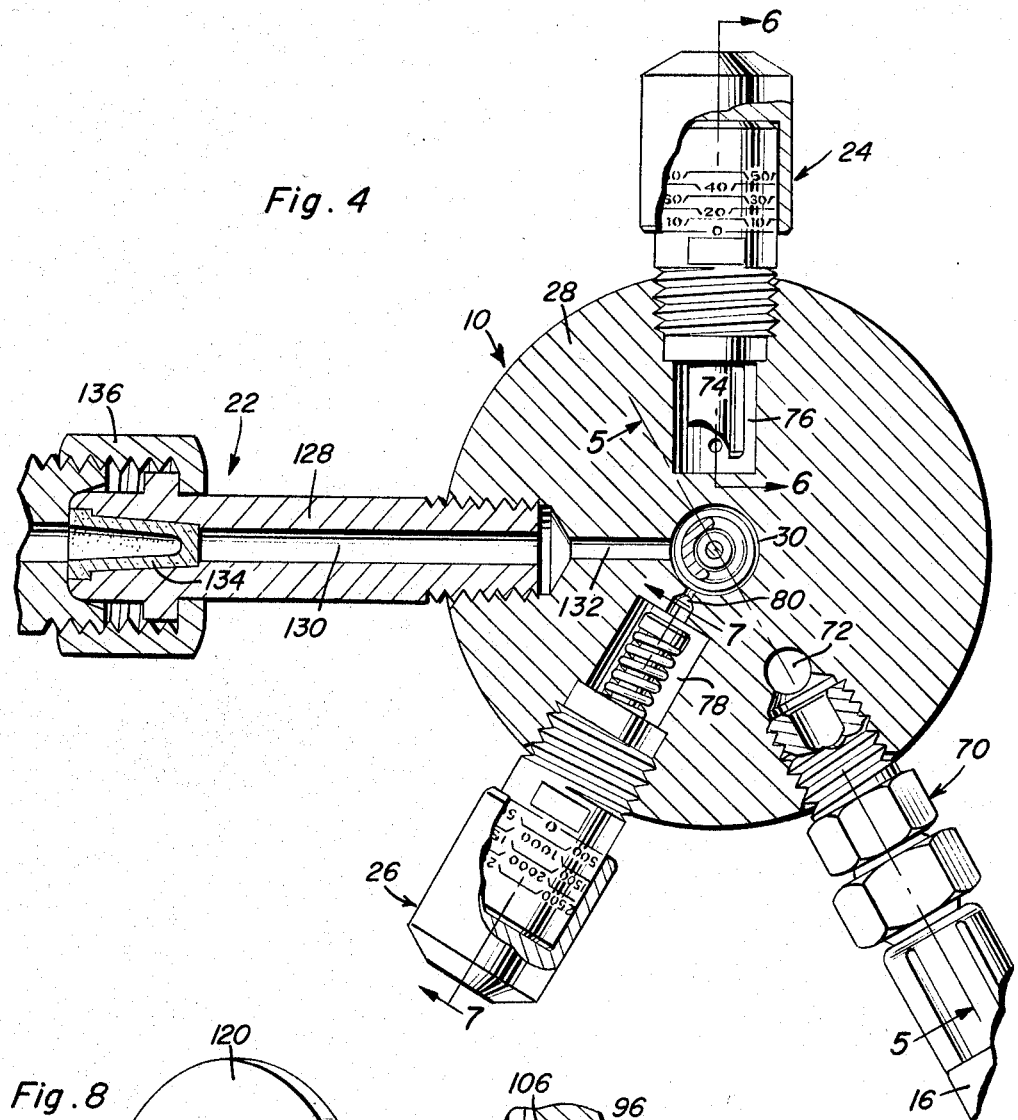
FIGURE 4 is a sectional view taken substantially through a plane indicated by section line 4—4 in FIGURE 3.

Referring now to the drawings in detail, it will be observed from FIGURES 1 and 2, that the regulating valve assembly generally referred to by reference numeral 10 is adapted to be connected by a valve fitting 12 to a source of fluid under pressure such as the tank 14 containing oxygen under pressure whereby a supply of oxygen may be fed by a flexible outlet conduit 16 to any suitable apparatus such as welding apparatus. The outlet pressure may therefore be selectively regulated to some desirable value by manipulation of the adjustment handle 18 connected to an adjustment screw 20. The regulating valve assembly is connected to the valve fitting 12 for supply of fluid under pressure thereto by means of the inlet fitting 22 and also has mounted thereon, and projecting therefrom radially, a pair of pressure indicating devices 24 and 26. The pressure indicator 24 is operative to measure the pressure in the outlet conduit 16 while the pressure indicator 26 is operative to measure the pressure in the supply tank 14.

Referring now to FIGURES 3 and 4 in particular, it will be observed that the regulating valve assembly includes a valve body 28 which is generally circular in cross-section. A central bore is formed within the valve body forming an inlet pressure chamber 30. The chamber bore includes an enlarged internally threaded portion 32 opening up into an outlet chamber 34 encircled by an externally threaded annular portion 36 extending axially from the valve body. A bonnet member 38 is thereby mounted on the valve body. The member 38 includes a diametrically enlarged portion 40 which is internally threaded for mounting on the projecting annular portion 36 of the valve body in order to close the outlet chamber 34. A diaphragm assembly 42 is held assembled between the annular axial end 44 of the valve body and the axial wall portion 46 of the member 38 which connects the portion 40 thereof to the axially elongated portion 48 within which the regulator spring 50 is housed. The regulator spring 50 is seated between a pair of force transmitting elements 52 and 54 having conical seats respectively engaging a mounting stub shaft 56 of the diaphragm assembly and the inner end of the adjustment screw 20 which is threadedly received within the axial end wall 58 of the bonnet member 38. The bonnet member is provided with a plurality of vent openings 60 so that one side of the diaphragm assembly is exposed to atmospheric pressure. The other side of the diaphragm assembly is exposed to the regulated pressure within the outlet chamber 34 within which there is also centrally disposed, a nozzle assembly 62. The nozzle assembly is fixedly mounted in the valve body by threaded engagement within the internally threaded portion 32 of the inlet chamber bore. The valve body is also provided with a bearing bore portion 64 of reduced diameter disposed in axial aligment between the inlet chamber bore and an atmospheric vent opening 66. Movably mounted within the centrally aligned bores of the valve body, is a regulating valve member 68 operative to control the flow of fluid from the inlet chamber 30 to the outlet chamber 34 through the nozzle assembly 62 in order to regulate the pressure within the outlet chamber 34. The outlet chamber as more clearly seen in FIGURE 5, is therefore connected to the flexible outlet conduit 16 by means of the outlet fitting 70 threadedly mounted in the valve body in communication with a connecting passage 72. Also, a static pressure passage 74 connects the outlet chamber 34 to a pressure measuring chamber 76 as more clearly seen in FIGURES 3 and 6. The pressure indicator 24 is therefore threadedly mounted in the valve body and extends radially therefrom projecting into the pressure measuring chamber 76 so as to indicate the pressure in the outlet chamber 34. The pressure indicator 26 on the other hand, is threadedly mounted in the valve body and extends radially therefrom in communication with a pressure measuring chamber 78 connected by passage 80 to the inlet chamber 30 as more clearly seen in FIGURES 4 and 7.

Figure 16:
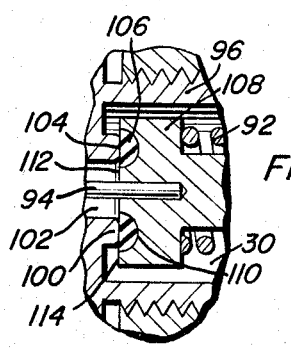
FIGURE 16 is an enlarged partial sectional view of a portion of the regulating valve assembly illustrated in FIGURE 3.

Referring now to FIGURES 3, 5 and 16 in particular, it will be observed that the valve member 68 is reciprocably mounted within the inlet chamber 30 by means of a polished rod 82 which extends through a washer 84 separating the inlet chamber 30 from the bearing bore portion 64 within which there is located a vibration dampening wiping seal 86 of the O-ring type Disposed on one axial side of the seal 86 is a backing ring 88 preferably made of material such as Teflon while a non-oxidizing lubricant carrying bushing 90 is disposed on the other axial side of the seal 86. It will therefore be apparent, that the valve member will be subject to the force of atmospheric pressure applied to the axial end of the polished rod 82 which together with the spring 92 located within the inlet chamber, urges the valve member to a valve-closing position. The seal and bearing facilities provided within the bearing bore portion 64 will effectively seal the inlet chamber from atmospheric pressure applied to the axial end of the polishing rod and will also be operative to exert a dampening force on the valve member so as to reduce vibration thereof. The foregoing arrangement results in the elimination of pressure balancing facilities and the adverse affects of fluctuating inlet pressure.

Connected to the valve member 68 and axially projecting therefrom opposite the polished rod 82, is a valve-actuating plunger element 94 adapted to be engaged by the diaphragm assembly 42 in response to reduction of pressure in the outlet chamber 34 in order to actuate the valve member to an open position against the bias of the spring 92 and atmospheric pressure applied to the end of the polished rod. When open, the valve member will admit fluid under pressure from the inlet chamber 30 into the outlet chamber through the nozzle assembly 62. The nozzle assembly is fixedly mounted within the valve body by means of an externally threaded hollow portion 96 connected to a head portion 98 centrally disposed within the outlet chamber. An axially projecting passage portion 100 extends from the head portion into the hollow portion defining a central passage 102 through which the actuating element 94 extends. The passage portion terminates at its inner end in an annular valve-engaging end face 104 which is relatively hard. The valve-engaging face 104 is adapted to exclusively engage the annular exposed surface of a toroidal valve seating insert 106 mounted in an enlarged end portion 108 of the valve member 68. The insert 106 being made of elastically resilient material will absorb shock loads produced during initial pressurization of the inlet chamber 30 and abrupt displacement of the diaphragm assembly 36. This material will also embed minute particles that may become lodged between the engaging valve surfaces so as to avoid fluid leakage as a result thereof. It will also be observed from FIGURE 16, that the annular receiving recess 110 is so dimensioned relative to the valve-engaging face 104 as to provide controlled radial clearances in order to prevent extrusion of the insert 106 because of the differential pressures respectively applied to the radially inner and outer annular surface portions 112 and 114 of the valve member end portion 108. Accordingly, a valve seating insert of relatively soft material such as neoprene rubber, may be utilized to advantage. The valve member will therefore effectively close the nozzle assembly under the bias of the spring 92 and atmospheric pressure and when the diaphragm assembly engages the actuating element 94, it will admit fluid under pressure into the central passage 102 which communicates with the radial passages 116 in the head portion 98 of the nozzle assembly.

Figure 8:
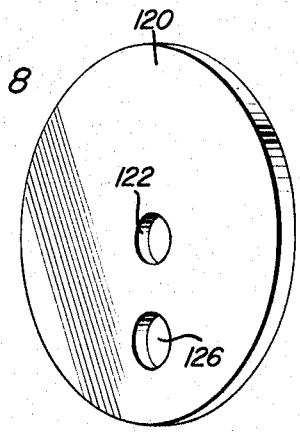
FIGURE 8 is a perspective view of a safety backup plate utilized with the valve assembly of the present invention.

The diaphragm assembly 42 includes a flexible diaphragm member 118 mounted on the stub shaft 56 which engages the actuating element 94 in response to displacement of the diaphragm member. Also mounted on the stub shaft 56 is a rigid backup plate 120 as more clearly seen in FIGURES 3 and 8 by means of which deflection of the diaphragm member by an increasing pressure in the outlet chamber 34, is limited. The plate 120 is therefore provided with a central opening 122 by means of which it is mounted on the stub shaft 56 and secured in place by means of the element 124. The backup plate 120 threfore abuts against the wall 46 of the bonnet member 38 for such purpose. Also provided in the backup plate member 120, is an opening 126 by means of which rupture of the diaphragm member is confined to a predetermined location when an excessive pressure develops within the outlet chamber 34. The excessive pressure may thereby be protectively vented through the vent opening 60 in the bonnet member 38 in order to avoid injury to any person who may be in the vicinity, and damage to the valve.

As hereinbefore indicated, the regulating valve assembly 10 may be connected to a source of fluid under pressure by means of the inlet fitting 22 which includes a connecting member 128 as more clearly seen in FIGURE 4, having an externally threaded portion at one end received within the valve body 28 for alining the passage 130 with the inlet passage 132 in the valve body. The other end of the member 128 may be provided with a conical seat for a sintered bronze filter element 134 locked in assembled position against conduit 16 by the coupling nut 136. Fluid under pressure will thereby be directly communicated with the inlet chamber 30 which also communicates through the passage 80 with the measuring chamber 78 to which the pressure indicator 26 is exposed. As more clearly seen in FIGURE 7, the pressure indicator is designed to accommodate a range of relatively high pressures by exposing a piston element 140 thereto. The piston element includes at one axial end a spring stop element 138, the other axial end extending through an indicator body 142 having an externally threaded portion 144 threadedly received within the valve body 28. The indicator body 142 includes a cylindrical portion extending radially from the valve body having indicia thereon spaced in an axial direction and exposed by radially outward movement of an indicator cap 144 secured to the end of the piston element 140. The shaft and the cap 144 secured thereto is urged to a radially inward position by means of the spring 146 which reacts between the piston element 140 and the spring retainer 148 seated within the indicator body. Also disposed within the indicator body within a bearing bore portion 150, is a wiping seal 152 engaging the shaft 140 to both seal the measuring chamber 78 and dampen vibratory movement of the shaft 140 and indicator cap 144 connected thereto. It will therefore be apparent, that the axial position of the indicator cap 144 will depend upon the force exerted on the piston element 140 by the pressure of the fluid in the inlet chamber compressing the spring 146. In a similar fashion, the pressure in the outlet chamber is indicated by the pressure indicator 24 also provided with an indicator body 154 having an externally threaded portion 156 for fixedly mounting the indicator body in the valve body 28. The indicator 24 is also provided with a shaft 158 which extends through the indicator body and is connected at one axial end to a piston element 160 and at the other axial end to an indicator cap 162. The piston element 160 when exposed to the pressure in the outlet chamber will therefore assume a position compressing the spring 164 which reacts between the piston element and the indicator body so that the indicator cap assumes an axial position exposing indicia on the cylindrical outer surface of the indicator body as more clearly seen in FIGURE 4. A relatively larger pressure face is provided on the piston element 160 as compared to the piston element 140 inasmuch as a lower pressure range is involved in connection with the pressure indicator 24. Also, an O-ring type wiping seal 166 is fixedly mounted by the indicator body in the case of the pressure indicator 24 for wiping engagement with the piston element 160.

Referring now to FIGURES 9 and 10, it will be observed that a modified form of pressure indicator for the inlet pressure is illustrated and generally referred to by reference numeral 168. The pressure indicator 168 may therefore replace the indicator 26 described with respect to FIGURES 1–8 and hence is provided with an indicator body 170 having an externally threaded portion 172 at one axial end for threaded mounting thereof within the valve body in axial alignment with the pressure measuring chamber for the inlet chamber. The indicator body is closed at its inlet end by means of a pressure snubbing element 174 having an inlet sensing orifice passage 176 enclosing within the indicator body, a piston element 180. The piston element is secured as by welding to a stop element 178 and which projects radially outwardly from the indicator body. The indicator body is provided with a cylindrical indicating surface portion 182 and an intermediate mounting portion 184. Connected to the projecting end portion of the piston 180, by means of a securing element 186, is the indicator cap 188. A wiping O-ring seal 190 is fixedly located within the indicator body between the apertured end wall 191 and a spring retainer 192 against which the spring 194 reacts to regulate the axial pressure on the O-ring seal so as to increase its effective life. The opposite ends of the spring 194 abut flanges on the retainer 192 and the stop element 178. Accordingly, the piston element 180 secured thereto will assume an axial position dependent upon the force applied thereto by the pressure in the inlet chamber and correspondingly control axial pressure on the O-ring 190. The snubbing element 174 will prevent any shock loads from being applied to the piston element while the shock absorbing ring element 196 is seated on the shaft against the piston element so as to absorb the shock when an excessive pressure force displaces the piston element to the end of its stroke. The pressure indicating indicia on the portion 182 of the valve body will therefore be exposed by the chamfered edge portion 197 of the indicating cap 188 in order to indicate the pressure to which the pressure indicator is exposed.

A modified form of pressure indicator for the lower range of outlet pressures is illustrated in FIGURES 11 and 12 and generally referred to by reference numeral 198. The pressure indicator 198 is similar in construction and operation to the pressure indicator 168 except that the wiping seal 200 is not fixedly located in the indicator body but is mounted for movement with the piston element 202 welded to the end of the shaft 204. Another form of pressure indicator for a low range of outlet pressure is illustrated in FIGURES 13, 14 and 15 and is generally referred to by reference numeral 206. The pressure indicator 206 is similar in construction and operation to the other pressure indicators except that the indicator body is formed from two threadedly interconnected sections 208 and 210 in order to clamp therebetween, a rolling seal element 212. The rolling seal element is connected to the axial end of the piston element 214 so that it will both sense and seal the outlet pressure with a minimum of friction. Also, the rolling seal element is dimensioned so as to accommodate a piston stroke which exceeds the outer diameter of the piston element.

From the foregoing description, the construction, operation and utility of the regulating valve assemblies and the various components thereof, will be apparent. It will therefore be appreciated, that the regulating assembly is readily adaptable for varying ranges of pressures. Also, the valve assembly is provided with built-in safety features, is more reliable in operation and less likely to malfunction.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A pressure regulator valve comprising, a valve body having an inlet chamber and an outlet chamber, nozzle means fixedly mounted in said body for establishing fluid communication between said inlet chamber and said outlet chamber, a valve member movably mounted in said inlet chamber and having a valve face engageable with said nozzle means, resilient valve seating means mounted in said valve face between portions thereof respectively exposed to fluid pressure in the inlet and outlet chambers, said nozzle means having a relatively hard valve engaging surface exclusively engaged with the resilient seating means for absorbing shock and preventing extrusion thereof when said portions of the valve face are subjected to differential pressures of the inlet and outlet chamber, said resilient seating means comprising, an annular insert having an exposed surface dimensionally exceeding the relatively hard valve engaging surface of the nozzle means by controlled radial clearances for preventing extrusion of the insert by pressure forces respectively exerted by fluid in the inlet and outlet chambers.

2. The combination of claim 1 including polished rod means fixed to said valve member and exposed to atmospheric pressure for regulating the bias imposed thereon, and vibration damping seal means mounted in said valve body for wiping engagement with the polished rod means for sealing the inlet chamber.

3. The combination of claim 2 wherein said nozzle means includes, an externally threaded hollow portion fixedly mounted in said inlet chamber, and a head portion disposed in the outlet chamber, central passage means projecting from the head portion and terminating in said valve engaging surface within the hollow portion, said head portion having a plurality of radial discharge bores communicating with said central passage means.

4. The combination of claim 3 including, a diaphragm member mounted on said valve body to close the outlet chamber therein, and an actuating plunger fixed to the valve member and extending through the nozzle means for engagement by the diaphragm member to open the nozzle means.

5. The combination of claim 4 including rigid means for limiting expansion of the diaphragm member by fluid pressure in the outlet chamber, said rigid means having a rupture confining opening therein through which the diaphragm member ruptures in response to excessive pressure for protectively venting the pressure.

6. A pressure regulator valve comprising, a valve body having an inlet chamber and an outlet chamber, nozzle means fixedly mounted in said body for establishing fluid communication between said inlet chamber and said outlet chamber, a valve member movably mounted in said inlet chamber and having a valve face engageable with said nozzle means, resilient valve seating means mounted in said valve face between portions thereof respectively exposed to fluid pressure in the inlet and outlet chambers, said nozzle means having a relatively hard valve engaging surface exclusively engaged with the resilient seating means for absorbing shock and preventing extrusion thereof when said portions of the valve face are subjected to differential pressures of the inlet and outlet chamber, a diaphragm member mounted on said valve body to close the outlet chamber therein, an actuating plunger fixed to the valve member and extending through the nozzle means for engagement by the diaphragm member to open the nozzle means, and rigid means for limiting expansion of the diaphragm member by fluid pressure in the outlet chamber, said rigid means having a rupture confining opening therein through which the diaphragm member ruptures in response to excessive pressure for protectively venting the pressure.

7. A pressure regulator valve comprising, a valve body having an inlet chamber and an outlet chamber, nozzle means fixedly mounted in said body for establishing fluid communication between said inlet chamber and said outlet chamber, a valve member movably mounted in said inlet chamber and biased to a position for blocking fluid flow into said nozzle means, a diaphragm member mounted on said valve body to close the outlet chamber therein, an actuating plunger fixed to the valve member and extending through the nozzle means for engagement by the diaphragm member, and rigid means for limiting expansion of the diaphragm member by fluid pressure in the outlet chamber, said rigid means having a rupture confining opening therein through which the diaphragm member ruptures in response to excessive pressure for protectively venting the pressure.

References Cited by the Examiner
UNITED STATES PATENTS

| | | | |
|---|---|---|---|
| 643,519 | 2/1900 | Miller | 137—505.38 |
| 806,470 | 12/1905 | Hodge | 137—505.38 X |
| 1,603,112 | 10/1926 | Jenkins | 137—505.42 |
| 2,342,659 | 2/1944 | Grove | 137—505.42 X |
| 2,478,040 | 8/1949 | Campbell | 137—505.42 |
| 2,595,156 | 4/1952 | Matasovie | 137—505.42 X |
| 2,662,348 | 12/1953 | Jacobsson | 137—505.41 |
| 2,666,278 | 1/1954 | Matasovie | 137—505.42 X |
| 2,739,611 | 3/1956 | Cornelius | 137—505.18 X |
| 2,806,481 | 9/1957 | Faust | 137—505.42 X |
| 2,941,543 | 6/1960 | Kleczek | 137—505.18 |
| 3,067,618 | 12/1962 | Briechle | 73—419 |
| 3,075,545 | 1/1963 | Eichelman | 137—505.18 |
| 3,113,460 | 12/1963 | Wrenn | 73—419 |

WILLIAM F. O'DEA, *Primary Examiner.*

ISADOR WEIL, *Examiner.*

H. WEAKLEY, *Assistant Examiner.*